United States Patent Office 3,312,630
Patented Apr. 4, 1967

3,312,630
METAL OXIDE ORGANOSOL PROCESS
AND PRODUCT
Milton C. Vanik, Brookville, Moises G. Sanchez, Severna Park, and Ellsworth G. Acker, Baltimore, Md., assignors to W. R. Grace & Co., New York, N.Y., a corporation of Connecticut
No Drawing. Filed Feb. 19, 1965, Ser. No. 434,102
18 Claims. (Cl. 252—301.1)

This is a continuation-in-part of application Ser. No. 280,179, filed Apr. 23, 1963, now abandoned, which is a division of application Ser. No. 7,078, filed Feb. 8, 1960, now U.S. Patent 3,151,086; of application Ser. No. 280,-181, filed Apr. 23, 1963, which is a division of application Ser. No. 7,080, filed Feb. 8, 1960, now abandoned; and of application Ser. No. 369,010, filed May 20, 1964, now abandoned.

This invention relates to a method of converting aqueous sols of metal oxides such as metal oxides such as zirconia, alumina, actinide oxides including thoria and urania, rare earth oxides including ceria and yttria, and mixtures thereof to sols or dispersions of sol particles of these compounds in organic liquids. More particularly, this invention relates to the preparation of organosols or dispersions of sol particles of these metal oxides in organic liquids as a stable stock material which are suitable for use as atomic reactor fuels or from which several types of atomic reactor fuels can be prepared.

This invention relates to the preparation of fuels for both solid and liquid nuclear reactors. Liquid homogeneous reactors may be one of three types: burner reactors, convertor reactors or breeder reactors. Burner reactors, are those in which fissionable materials are consumed as fuels but virtually no fuel is generated. Convertor reactors are those which produce a different fissionable fuel than is destroyed in the fission process. Breeder reactors are those which produce more of the same type of fissionable fuel as is being consumed in the reactor.

The nuclear reactions involved in liquid homogeneous reactors of this type are well known. A typical example is a two region reactor using a mixed thoria-urania sol as a fuel. In this reactor a core of uranium solution is surrounded by a blanket of thorium 233. As the uranium in the core fissions, it gives off neutrons, some of which are adsorbed by the thorium 232 to convert it to thorium 233. Thorium 233 decays with a half life of 23.3 minutes to yield protactinium 233 which in turn decays to uranium 233. Uranium 233 is a fissionable uranium isotope and is itself a suitable fuel. These breeder reactors may also be designed as single region reactors which contain a homogeneous mixture of fissionable and fertile material in a moderator. These reactors differ from single region reactors in that they have larger reactor diameters in order to minimize neutron losses.

In the aqueous homogeneous reactor systems, the moderator is water or heavy water. In the non-aqueous liquid homogeneous systems, organic liquids, such as the polyphenyls are used. These high boiling organic materials have several advantages over water as the moderators in homogeneous liquid reactors. One obvious advantage, however, is that there is no pressure problem in operating at temperatures above 200° C. in that the media are chosen from organic compounds that boil in a temperature range of operation of the reactor. Aqueous systems operating at high temperatures and high pressures also tend to be corrosive toward the metals used in the reactor. Using a suitable organic compound as a moderator greatly simplifies this problem.

Liquid homogeneous reactors have several advantages over conventional type reactors used in nuclear power development. Briefly, these advantages reside in a higher power density than is available in a heterogeneous reactor, the ease with which fuel can be added to, and fission products removed from, the reactor system, and the wide size latitude a liquid homogeneous reactor system allows, thus making possible reactors which range in size from very small units to reactors large enough to be utilized in nuclear power plants.

The prior art systems depend on the use of uranyl sulfate or uranyl phosphate in solution as a fuel in the aqueous homogeneous reactors. These reactor systems have not been particularly satisfactory because both the sulfuric acid and phosphoric acid systems tend to corrode the equipment. Sulfur has an appreciable adsorption cross-section so that neutron economy was also a factor to be considered.

Because of these disadvantages, considerable effort has been expended toward preparing fuel systems which comprised solids, such as $UO_3$, which were placed in the reactor in slurry form. These slurries had several obvious disadvantages such as the erosion of the equipment and attrition of the materials themselves.

It has been recognized that these problems can be solved by using sols of urania, thoria or thoria-urania as fuels in liquid homogeneous reactors. These types of sols have the advantage of being homogeneous particles of colloidal size and have been found to avoid the disadvantages that are present when thoria or urania slurries are used. There is, for example, no need to furnish agitation to prevent solids separation. These particles are not subject to attrition and, because of the small particle size of the sols (200 to 2000 A.), the erosion of equipment is not significant. Sols have relatively low viscosities and thus can be easily pumped.

The method of preparing aqueous metal oxide sols which are useful in aqueous homogeneous reactors and are amenable to coating with silica has been disclosed previously. Briefly, these sols may be prepared, for example, by dissolving a suitable salt of the metal, e.g. uranium, thorium or a mixture of the salts thereof in deionized water. The preferred salts are the nitrates or chlorides. This solution is placed in a suitable vessel, part of the solution is withdrawn, and this portion is passed through a cathode compartment of an electrodialysis cell divided by a membrane of an ion exchange resin. This portion is then returned to the larger body of solution which is being maintained at an elevated temperature and this withdrawal, dialysis, and addition back is continued until the solution is essentially electrolyte free. The product sol is then densified by heating under non-evaporative conditions, and the dense sol is passed through an ion exchange resin to remove electrolytes. These sols may then be clad with silica, if it is desirable to do so, using conventional hydrous silica to coat the sol particles. These sols are stable at the temperatures employed in nuclear reactors. The resulting product is a hydrous oxide sol which is dispersed in an aqueous medium. Metal oxide aquasols which can be formed by this method include zirconia, alumina, and thoria aquasols, rare earth oxide sols including ceria aquasols, and mixtures thereof.

In the field of solid fuel reactors, actinide metal oxides have become of paramount importance, both in the preparation of ceramic fuel elements containing the oxides dispersed therein, and for the preparation of graphite fuel elements containing actinide carbides dispersed therein. In their preferred form the actinide metal oxides are colloidal in size and are preferably formed as aquasols. However, the aqueous systems introduce technical difficulties in the production of graphite fuel elements. The aquasols do not easily wet carbon, and even if carbon is dispersed in the aquasol, it has a limited stability, tending to agglomerate and settle from the sol. Furthermore, the aquasols are not compatible with graphite or with graphitization resins employed to make the actinide carbide-graphite systems.

It is an object of this invention to convert aqueous metal oxide sols including thoria, urania, and thoria-urania sols to high boiling organosols in media such as polyphenyls that are useful as fuel in liquid homogeneous reactors.

It is another object of this invention to convert aqueous metal oxide sols including thoria, urania, and thoria-urania sols to organosols which have a high stability, which are easily converted to high boiling organosols, and which are readily compatible with graphite and with graphitization resins for making carbide graphite systems.

The organosols of this invention can be prepared by treating an aqueous sol of the type set forth above with a flushing agent, that is an agent which aids in the transfer of the particles from the aqueous to the organic medium, followed by dispersion of the treated aquasol in an organic liquid. The temperature of the aqueous sol-organic liquid mixture is such that the liquid components of the mixture are in the liquid state. The water is then removed from the sol by azeotrope distillation, for example. The volume of the organic liquid phase can be maintained by the constant addition of organic liquid to replace the quantity removed by distillation. As the dehydration continues, the boiling point of the sol rises until the boiling point of the alcohol is reached. The anhydrous organosol produced can be concentrated by further evaporation of the organic medium.

The organosol can then be converted to a high boiling organosol for use as a homogeneous liquid reactor fuel, or it can be mixed with colloidal carbon, graphite or graphitization resins for the preparation of graphite fuel elements for solid fuel reactors. The particles are converted to a high boiling organosol by adding the organosol such as alcohol sol to a hot solution of a high boiling organic compound which is a solid at room temperature, such as a polyphenyl in alcohol, and removing the alcohol by increasing the temperature to a temperature near the boiling point of the high boiling organic medium.

The water-immiscible organic liquids employed to produce the organosols of this invention have a boiling point higher than water and include the following: aromatic alcohols such as benzyl alcohol; carbon tetrachloride; furfural; tetrachloroethane; aromatic hydrocarbons such as benzene; ethers such as isopropyl ether, esters such as ethyl acetate; primary and secondary monohydric alcohols having at least 4 carbons such as n-butanol, n-amyl alcohol, n-hexanol, n-heptanol, n-octanol, etc.; branch chain alcohols such as isobutanol, iso-amyl alcohol, 2,2,4-trimethyl-1-hexanol; secondary alcohols such as 2 butanol, 2 octanol, 2 pentanol, etc. The term "organic liquid" refers to organic compounds which are liquid at room temperature. The term "water-immiscible" is used to characterize organic liquids which are not soluble in water in all proportions.

The flushing agent used in this process should be selected with respect to the surface charge on the particles so that it is capable of coating the particles. Thus, if a sol of silica clad particles are used, a cationic agent must be employed. Suitable high boiling cationic agents include, for example, n-hexylamine, n-heptylamine, n-octylamine, n-nonylamine, n-decylamine, etc. Preferred agents include: n-heptylamine, n-hexylamine and n-octylamine. Where the metal oxide sol particles are not coated, an anionic agent must be used to neutralize the charge and to coat the particles to prevent aggregation.

Suitable anionic are organic acids which have a low water solubility and include: straight chain fatty acids such as capric, heptoic and caprilic acid, or branch chain fatty acids with limited water solubility such as isovaleric, isocaproic, etc., or phenyl derivatives of fatty acids such as alpha-phenyl propionic acid and benzoic acid. The preferred agents are high boiling point organic acids such as decanoic acid and benzoic acid.

The organic flushing agent can be used at concentration of from 7 to 20 weight percent based on the weight of the sol particles being treated. A concentration of 10 weight percent is preferred, but the suitable concentration will vary depending upon the particular sol and particular flushing agent employed.

The organic suspending media useful in liquid homogeneous reactors are organic compounds boiling in the range of 250° C. In the liquid homogeneous reactors that have been operating to date, the polyphenyls, specifically biphenyl, have been used as the organic media. Other materials such as polyphenols and phenyl ethers would probably be suitable organic media for use in the preparation of organic moderated fuel sytems for liquid homogeneous reactors.

The temperature of dehydration of the organosol-water mixture of this invention is, of course, dependent upon the boiling point of the organic liquid-water isotope in the dehydration step and the boiling point of the organic medium to which the sol is being transferred. Suitable results have been obtained in the butyl alcohol stabilization step, for example, by operating in the range of 90 to 150° C. The preferred range of operation is 92 to 120° C. The temperature in the last step in the preparation of the sols for polyphenyls, for example, is on the order of 250° C.

Pressure is not critical but for reasons of economy and ease of operation we prefer to carry out the process at atmospheric pressure. However, the reaction can be run at pressures above or below atmospheric in cases where it would be advantageous to do so.

The invention is further illustrated by the following typical but non-limiting examples.

*Example I*

An aqueous thoria sol was prepared as follows: 4000 grams of a solution of thorium nitrate and deionized water containing 10% by weight equivalent $ThO_2$ was charged into a heated reservoir for use in preparing a thoria sol. This sol was circulated at a rate of approximately 150 cc./min. through the cathode compartment of an electrodialysis cell divided by an ion exchange membrane of Amberplex Al. The temperature in the reservoir was maintained at from 82 to 97° C. The thorium nitrate solution was withdrawn from this vessel at a rate of 150 cc./min. through a cooled heat exchanger and pumped into the above described cell. The temperature of the incoming solution was controlled to maintain a cell temperature of about 25 to 32° C. The solution leaving the cell was passed through a heat exchanger where it was heated to 92 to 97° C. and was then returned to the reservoir. Evaporation losses were compensated for by the addition of deionized water as needed. Circulation of the solution was continued over a total period of about 30 hours. During electrodialysis the amperage dropped from about 10 to a value of about 1.5. The pH rose from about 2 to about 6.7.

*Example II*

Sols of unclad thoria in n-butyl alcohol were prepared using thoria sols resulting from the electrodialysis of a thorium salt carried out with the method set out in Example I above. In a typical run, 130 ml. of a thoria sol containing 4% thoria and having a pH of 5.2 and a particle size distribution of about 300 to 1000 Angstroms was run through a mixed bed ion exchange resin column in the hydroxyl and hydrogen form and a sol having a pH of 9.5 that contained 5% thoria was recovered. A charge of 0.5 gram of decanoic acid was added to this sol and the temperature raised to 45° C. for 10 minutes. This treatment reduced the pH of the sol to 8.0. The sol was then dispersed in 130 ml. of n-butyl alcohol by shaking in a separatory funnel. An emulsion was formed which did not separate after standing 24 hours at room temperature. The contents of the separatory funnel were transferred to a flask for removal of the water as a water-butyl alcohol azeotrope at a temperature of 92.5° C. Any volume lost was restored by the continuous addition of dry n-butyl alcohol. After water removal was complete, the temperature of the vessel was increased to 118° C. and refluxed for an additional period of two hours. The resulting sol was stable and nonsettling at room temperature for a period of at least ten days. This illustrates how a n-butyl alcohol sol of unclad thoria can be successfully prepared.

A portion of this sol was run into a solution of 100 g. biphenyl which had been melted and dissolved in 200 ml. n-butyl alcohol, and the temperature was increased to 118° C. The butyl alcohol sol was added until the concentration of thoria in the biphenyl was 5%. The temperature of the dispersion of the sol particles was raised to 250° C. to remove the alcohol. The biphenyl dispersion was heated to 240° C. for 7 hours in a Vycor tube to determine its thermal stability. At the end of this time the dispersion was examined, and no evidence of deterioration was noted. These data illustrate that a biphenyl dispersion of unclad thoria can be prepared which is stable in the range of 240 to 250° C.

*Example III*

This example shows the use of benzoic acid as a flushing agent and carbon tetrachloride as the organic liquid phase in the organosol.

A 10 ml. sample of a thoria aquasol (8 weight percent thoria) was mixed with 0.16 gm. benzoic acid. A flocculation of the sol particles by the benzoic acid was observed. The acid treated aquasol was then intimately mixed with carbon tetrachloride. The carbon tetrachloride phase which separated from the mixture was a milky white organosol.

*Example IV*

This example is similar to Example III but shows the formation of a urania organosol in carbon tetrachloride. A 100 ml. sample of a 10 weight percent uranous oxide aquasol was mixed with 1.10 gm. benzoic acid. The acid-treated aquasol was then extracted with 100 ml. of carbon tetrachloride. The organic liquid layer was drawn off, concentrated, and dehydrated by vacuum evaporation.

*Example V*

A 10 ml. sample of a 10 weight percent uranous oxide aquasol was mixed with 0.110 gm. benzoic acid, and the acid-treated aquasol was then extracted with 10 ml. of sym-tetrachloroethane. The organic layer was removed and dried by vacuum evaporation.

The procedure above was duplicated using benzyl alcohol as the extracting medium.

*Example VI*

An 8 ml. sample of a 29 weight percent uranous oxide aquasol was mixed with 2 ml. water and then with 0.316 gm. benzoic acid. The particles were extracted with 10 ml. furfural, forming an organosol having a 17 weight percent solids.

*Example VII*

This example shows the formation of an organosol containing both zirconia and urania sol particles. A 10 ml. sample of a 23 weight percent zirconia aquasol was mixed with 100 ml. of a 15 weight percent urania aquasol. A 10 ml. sample of the resulting aquasol was mixed with 0.22 gm. benzoic acid. The acid-treated aquasol was extracted with an equal volume of carbon tetrachloride and formed a black fluid stable mixed oxide organosol.

*Example VIII*

This example shows the formation of a mixed thoria-urania organosol. A 10 ml. sample of a 10 weight percent urania sol was mixed with 0.11 gm. of benzoic acid. A 10 ml. sample of 7.7 weight percent thoria sol was mixed with 0.16 gm. benzoic acid, and the two aquasols were mixed. The mixed aquasol was extracted with 20 ml. carbon tetrachloride. The organosol formed was dried by azeotrope distillation under vacuum, carbon tetrachloride being added to maintain a constant volume of the organic phase.

Obviously many modifications and variations of the invention as hereinabove set forth may be made without departing from the essence and scope thereof and only such limitations should be applied as are indicated in the appended claims.

We claim:

1. A process for forming a metal oxide organosol comprising the steps of:
   (a) a mixing an aquasol of metal oxide selected from the group consisting of actinide oxides, rare earth oxides, alumina, zirconia, and mixtures thereof with from 7 to 20 percent, based on the weight of the metal oxide, of an organic carboxylic acid having a low water solubility to form an organic acid coating on the sol particles,
   (b) mixing the acid-treated aquasol with a water-immiscible organic liquid and allowing the sol particles to be extracted into the organic liquid phase, the temperature of the mixture being such that the water and organic liquid are in the liquid state, and
   (c) removing the water from the organic phase.

2. The process of claim 1 wherein the metal oxide is urania.

3. The process of claim 1 wherein the metal oxide is thoria.

4. The process of claim 1 wherein the metal oxide is zirconia.

5. The process of claim 1 wherein the metal oxide is a mixture of zirconia and urania.

6. The process of claim 1 wherein the metal oxide is a mixture of thoria and urania.

7. A process for forming a metal oxide organosol comprising the steps of:
   (a) mixing an aquasol of metal oxide selected from the group consisting of actinide oxides, rare earth oxides, alumina, zirconia, and mixtures thereof with from 7 to 20 percent, based on the weight of the metal oxide, of an organic carboxylic acid having a low water solubility to form an organic acid coating on the sol particles,
   (b) mixing the acid-treated aquasol with a water-immiscible organic liquid, and allowing the sol particles to be extracted into the organic liquid phase, the temperature of the mixture being such that the water and organic liquid are in the liquid state,
   (c) removing the water from the organic phase to form an organosol,
   (d) mixing the organosol with an organic medium selected from the group consisting of polyphenyls, polyphenols, phenyl ethers and mixtures thereof, and
   (e) removing said organic liquid from the mixture by distillation to form a stable high boiling organosol.

8. The process of claim 7 wherein the metal oxide is urania.

9. The process of claim 7 wherein the metal oxide is thoria.

10. The process of claim 7 wherein the metal oxide is zirconia.

11. The process of claim 7 wherein the metal oxide is a mixture of zirconia and urania.

12. The process of claim 7 wherein the metal oxide is a mixture of thoria and urania.

13. A metal oxide organosol consisting essentially of colloidal particles of metal oxide selected from the group consisting of actinide oxides, rare earth oxides, zirconia, and mixtures thereof having a coating of an organic carboxylic acid having a low water solubility, said colloidal particles being dispersed in a water-immiscible organic liquid.

14. The composition of claim 13 wherein the metal oxide is urania.

15. The composition of claim 13 wherein the metal oxide is thoria.

16. The composition of claim 13 wherein the metal oxide is zirconia.

17. The composition of claim 13 wherein the metal oxide is a mixture of thoria and urania.

18. The composition of claim 13 wherein the metal oxide is a mixture of zirconia and urania.

References Cited by the Examiner

UNITED STATES PATENTS

| | | | |
|---|---|---|---|
| 2,692,863 | 10/1954 | Iler | 252—301.1 |
| 2,696,474 | 12/1954 | Heard | 252—301.1 |
| 2,786,042 | 3/1957 | Iler | 252—301.1 |
| 2,984,628 | 5/1961 | Alexander et al. | 252—301.1 |
| 3,004,920 | 10/1961 | Ryznar | 252—301.1 |
| 3,256,204 | 6/1966 | O'Connor | 252—301.1 |

FOREIGN PATENTS

| | | |
|---|---|---|
| 556,034 | 4/1958 | Canada. |
| 904,679 | 8/1962 | Great Britain. |

CARL D. QUARFORTH, *Primary Examiner.*

BENJAMIN R. PADGETT, *Examiner.*

S. J. LECHERT, *Assistant Examiner.*